United States Patent

Wong et al.

[11] Patent Number: 5,153,474
[45] Date of Patent: Oct. 6, 1992

[54] PLUG IN BRUSH RETAINER FOR A FRACTIONAL HORSEPOWER ELECTRIC MOTOR

[75] Inventors: Chi N. Wong, Lei King Wan; Kam S. Mok, Chai Wan, both of Hong Kong

[73] Assignee: Johnson Electric S.A., Switzerland

[21] Appl. No.: 703,875

[22] Filed: May 22, 1991

[51] Int. Cl.⁵ .............. H02K 13/10; H01R 39/40
[52] U.S. Cl. ..................... 310/245; 310/71; 310/249
[58] Field of Search ........... 310/71, 239, 245, 247, 310/249

[56] References Cited

U.S. PATENT DOCUMENTS

| | | | |
|---|---|---|---|
| 3,445,705 | 5/1969 | Fuller et al. | 310/247 |
| 3,636,393 | 1/1972 | Pieper | 310/71 |
| 4,677,329 | 6/1987 | Secoura | 310/71 |
| 4,873,464 | 10/1989 | Wang | 310/249 |
| 4,963,779 | 10/1990 | Lentino et al. | 310/71 |
| 5,015,896 | 5/1991 | Wong | 310/71 |

FOREIGN PATENT DOCUMENTS 902081403 8/1990 China.

Primary Examiner—Steven L. Stephan
Assistant Examiner—D. R. Haszko
Attorney, Agent, or Firm—Ostrolenk, Faber, Gerb & Soffen

[57] ABSTRACT

A separately-excited fractional-horsepower electric motor in which a field coil is connected to one of the brushes by means of a brush retainer which is formed with a plug portion such that, on fitting the brush retainer to the brush holder, the plug portion penetrates and engages a socket connected to the field coil.

25 Claims, 2 Drawing Sheets

PLUG IN BRUSH RETAINER FOR A FRACTIONAL HORSEPOWER ELECTRIC MOTOR

BACKGROUND OF THE INVENTION

The invention relates to the provision of a plug-in field coil connector in a fractional-horsepower electric motor to facilitate assembly of the motor.

A typical fractional-horsepower electric motor comprises at least one field coil which has one end for connection to a first terminal member; a first terminal member to which said one end is connected; at least two brushes; a brush holder for each brush; guide means formed on one of the brush holders; and a brush retainer movable, on the guide means, into and out of a retaining position in which the brush retainer is electrically connected to and retains a brush in said one of the brush holders.

To connect the brush retainer to a field coil in a motor such as this, it is normal practice to solder one end of an electrical lead to the brush retainer and to connect the other end of the lead to the field coil either by soldering or by means of a second terminal member which is cooperable with the first terminal member to form an electrical connection. Clearly, this is a time-consuming, labor intensive process.

SUMMARY OF THE INVENTION

An object of the present invention is to provide a fractional-horsepower electric motor with a plug-in field coil connector to facilitate assembly of the motor.

This is achieved by providing the brush retainer with a second terminal member which is movable into and out of engagement with the first terminal member on movement of the brush retainer into and out of its retaining position.

Thus, according to the invention, there is provided a fractional-horsepower electric motor in which at least one field coil is connected to a first terminal member; a brush retainer is movable on guide means formed on a brush holder, into and out of a retaining position in which the retainer is electrically connected to and retains a brush in the brush holder; and the brush retainer is provided with a second terminal member which is movable into and out of engagement with the first terminal member on movement of the brush retainer into and out of the retaining position.

Conveniently, the guide means may comprise two side extensions projecting transversely on opposite sides of an axial plane through the brush holder and two abutment surfaces respectively formed on the side extensions and facing inwardly and away from the radially outer surface of the brush holder.

In this case, the brush retainer may comprise a retaining portion engaging the radially outer surface of the brush holder; grips on opposite sides of the retaining portion engaging the two abutment surfaces formed on the side extensions of the brush holder so as to permit guided movement of the brush retainer along the two side extensions; and a connecting portion extending laterally from one side of the retaining portion and carrying, at its free end, the second terminal member which is engageable with the first terminal member connected to the field coil.

The brush retainer may be of sheet metal and, to help secure the brush retainer in its retaining position, a concavity having a wall extending transversely of the axis of the motor may be formed in the radially outer surface of the brush holder and at least one retaining strip pressed out of the retaining portion may be disposed within the concavity so that the free end of each retaining strip lies adjacent the wall of the concavity for abutment with the wall to prevent withdrawal of the brush retainer from its retaining position. Preferably, there are two or more retaining strips and the wall of the cavity lies in a plane extending perpendicular to the axis of the motor. This ensures that the brush retainer is held squarely in place.

The first and second terminals may constitute the members of a plug and socket connection and, in a preferred embodiment of the invention, a moulded plastics end ring is provided adjacent the brush holders, the first terminal is a socket comprising a metal-lined aperture formed in the end ring with an axis extending parallel to the axis of the motor and the second terminal comprises a plug engageable in this socket.

In a typical motor according to the invention, two field coils are respectively provided with ends for connection to first terminal members; two first terminal members are connected, respectively, to two of said ends; guide means are formed on each of the brush holders; two brush retainers are respectively movable, on the guide means, into and out of retaining positions in which the brush retainers are respectively connected to and retain the two brushes in the brush holders; and the two brush retainers are respectively provided with two second terminal members which are respectively movable into and out of engagement with said two first terminal members on movement of the brush retainers into and out of their retaining positions.

In this case, the guide means on each brush holder may comprise two side extensions projecting transversely on opposite sides of an axial plane through the brush holder and two abutment surfaces respectively formed on the side extensions so as to face inwardly and away from the radially outer surface. In addition, each brush retainer may comprise a retaining portion engaging the radially outer surface of a brush holder, grips on opposite sides of the retaining portion engaging the two abutment surfaces on the side extensions of the brush holder so as to permit guided movement of the brush retainer along the two side extensions, and a connecting portion extending laterally from one side of the retaining portion and carrying, at its free end, one of the two second terminal members.

In an alternative form of motor according to the invention in which two field coils are respectively provided with ends for connection to first terminal members; two first terminal members are connected, respectively, to two of said ends; and two second terminal members are respectively movable into and out of engagement with the two first terminal members on movement of the brush retainer into and out of its retaining position, the two second terminal members are provided on only one of the brush retainers. In this case, the guide means on said one of the brush holders may comprise two side extensions projecting transversely on opposite sides of an axial plane through the brush holder and two abutment surfaces respectively formed on the side extensions so as to face inwardly and away from the radially outer surface of said one of the brush holders. In addition, the brush retainer may comprise a retaining portion engaging the radially outer surface of the brush holder, grips on opposite sides of the retaining portion engaging the two abutment surfaces on the side extensions of the brush holder so as to permit guided movement of the brush retainer along the two side extensions, and two connecting portions extending laterally from opposite sides of the retaining portion and respectively carrying, at their free ends, the two first terminal members.

In practice, in both of the alternative forms of the invention hereinbefore described, four terminal members are connected, respectively, to the four ends of the two field coils, but only two of these terminal members constitute first terminal members which contribute to the present invention.

Thus, in a preferred embodiment of the invention, a moulded plastics end ring is provided adjacent the two brush holders, the two first terminal members are sockets comprising metal lined apertures formed in the end ring with axes extending parallel to the axis of the motor, and the two second terminal members comprise plugs engageable in these sockets.

In another preferred electric motor according to the invention, a stator comprises a stack of field laminations, moulded plastics end rings adjacent at opposite ends of the stack, two field coils, and brush gear at one end of the stack; a rotor incorporating a commutator is mounted in the stator for rotation about the axis of the motor; the end ring the brush gear is formed with at least two apertures having axes extending parallel to the axis of the motor and at least two further apertures are formed in at least one of the two end rings; the two apertures in the end ring adjacent the brush gear are provided with metal lining to form two first terminal sockets and two of the remaining apertures are provided with metal lining to form two main terminal sockets for receiving lead terminals connected to external circuit leads; and one end of each field coil is connected to the metal lining of one of the two first terminal sockets, one end of the other field coil is connected to the metal lining of the other first terminal socket, and the other ends of the two field coils are respectively connected to the two main terminal sockets.

BRIEF DESCRIPTION OF THE DRAWINGS

Embodiments of the invention are hereinafter described, by way of example, with reference to the accompanying drawings, in which.

DESCRIPTION OF THE PREFERRED EMBODIMENTS

Figure 1:
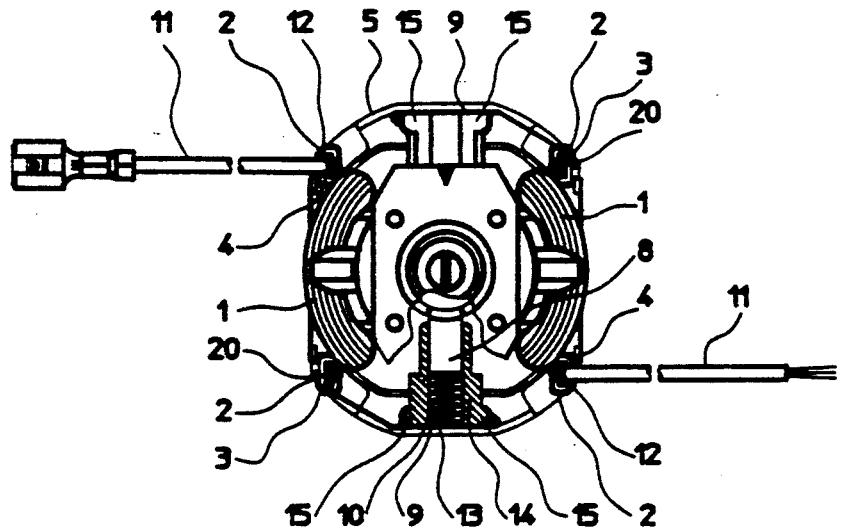
FIG. 1 is a part-sectional end view of a universal electrical motor embodying the present invention.
Figure 2:
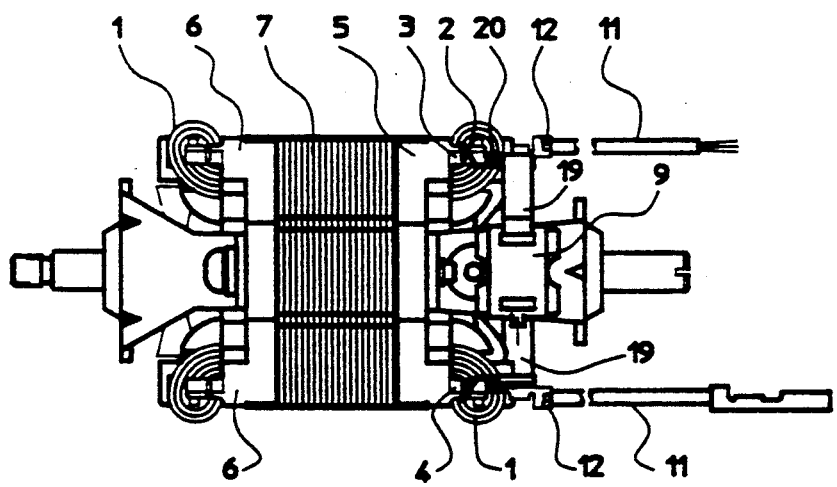
FIGS. 2 and 3 are plan and side views of the motor shown in FIG. 1.
Figure 3:
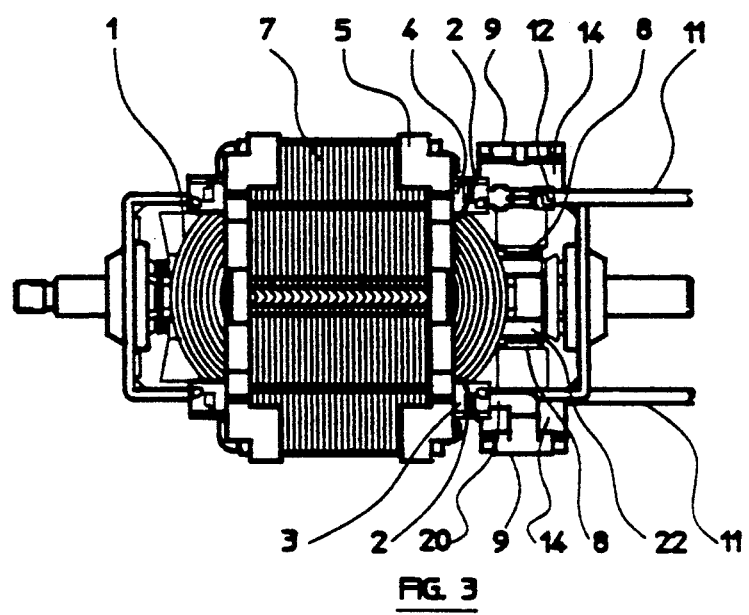

The universal electrical motor shown in FIGS. 1 to 3 has two field coil 1. Each field coil 1 has two ends 2 respectively connected to a first terminal member 3 and a main terminal member 4. The two first terminal members 3 (one for each field coil) and the two main terminal members 4 (also one for each field coil) consist of metal lined sockets molded integrally with a first plastic end ring 5. Two such end rings 5 and 6 are provided and form part of a spool structure for supporting the field coils 1 within the field laminations 7 of the motor.

As shown in FIG. 1, first terminal members 3 connected to the field coils 1 are connected to the brushes 8 of the motor by means of brush retainers 9 and brush springs 10. Two electrical leads 11, each provided with a lead terminal member 12 in the form of a plug, are connected, respectively, to the two field coils 1 through diagonally opposite main terminal members or sockets 4 which receive the lead terminal members 12.

Figure 5:
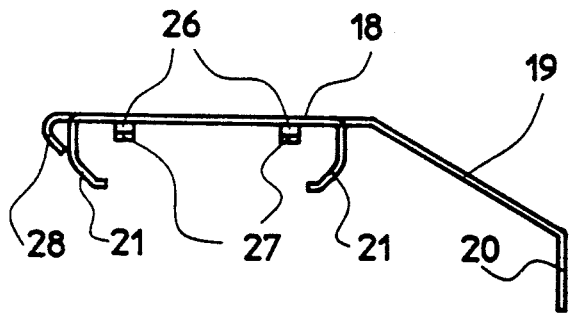
FIGS. 5 to 7 are plan, side and sectional end views of a brush retainer forming part of the motor shown in FIGS. 1 to 3.
Figure 7:
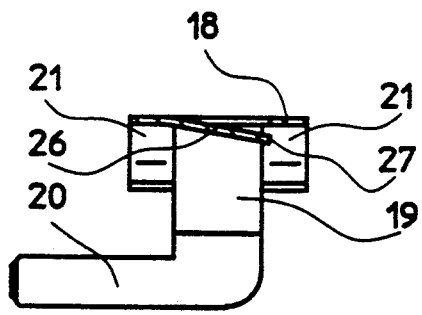
Figure 6:
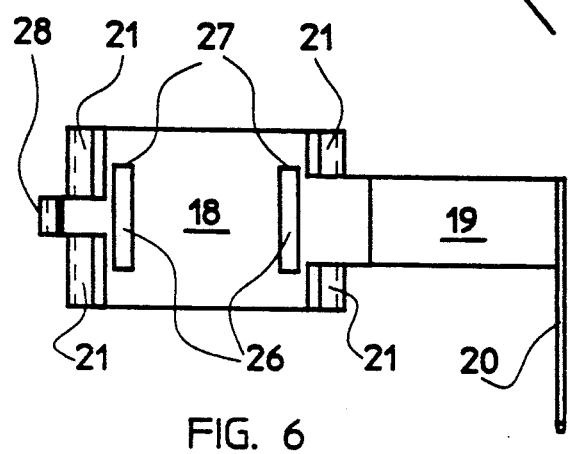
Figure 4:
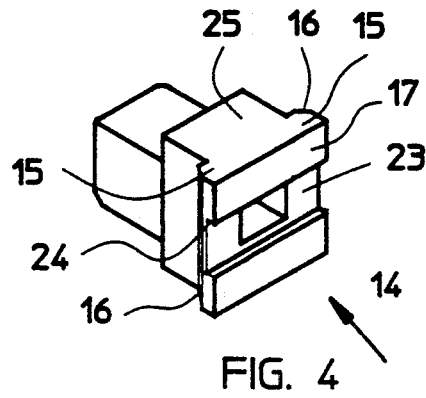
FIG. 4 is an isometric view of a brush holder forming part of the motor shown in FIGS. 1 to 3.

Each brush 8 and its spring 10 are slidably mounted in a passageway 13 formed in a brush holder 14. At its radially outer end, each brush holder 14 is formed with guide means in the form of side extensions 15. As shown in FIG. 4, two abutment surfaces 16, respectively formed on the side extensions 15 face inwardly and away from the radially outer surface 17 of the brush holder 14. Each brush retainer 9 is pressed from sheet brass and, as shown in FIGS. 5 to 7, has a retaining portion 18, a connecting portion 19 and a second terminal member 20 in the form of a plug which is receivable in one of the first terminal members or sockets 3. Grips 21 on opposite sides of the retaining portion 18 are shaped to cooperate with the side extensions 15 of the brush holder 14 by engaging the abutment surfaces 16 and so, with the retaining portion 18, provide a "C"-section for gripping the brush holders 14. The connecting portion 19 extends from one side of the retaining portion 18 and the second terminal member 20 depends from the free end of the connecting portion 19. When mounted, each brush retainer 9 traps a brush spring 10 between its retaining portion 18 and a brush 8, to press the brush 8 against the commutator 22 (FIG. 3), and the second terminal member or plug 20 is received in the first terminal member or socket 3 of one of the field coils 1 to thereby electrically connect the coil 1 to the brush 8.

Connection of the coil 1 to the brush 8 can therefore be easily accomplished by sliding the retaining portion 18 of the brush retainer 9 along the radially outer surface 17 of the brush holder 14 so that the grips 21 on opposite sides of the retaining portion 18 ride over the side extensions 15 of the brush holder 14. At the same time, because of the shape and size of the connecting portion 19, this single translational movement causes the second terminal member or plug 20 to penetrate and engage the first terminal member or socket 3.

As shown in FIG. 4, to hold the brush retainer 9 more securely in place, the radially outer surface 17 of the brush holder 14 is formed with a concavity 23 having a transversely extending end wall wall 24 which extends perpendicular to the axis of the motor, adjacent the axially outer surface 25 of the brush holder 14. The concavity 23 accommodates retaining strips 26 which, as shown in FIGS. 5 to 7, are pressed out of the retaining portion 18 of the brush retainer 9. As shown more clearly in FIG. 7, the free end 27 of each strip 26 is disposed inwardly of the remainder of the retaining portion 18 and, as the brush retainer 9 is pressed onto the brush holder 14, the free ends 27 of the strips 26 are deflected outwards as they ride over the radially outer surface 17 of the brush holder 14. Then, when the free ends 27 reach the side wall 24 of the concavity 23, the strips 26 move into the concavity 23, as a result of their resiliency, and the free ends 27 engage the end wall 24 of the concavity 23 to hold the brush retainer 9 in place and resist its removal from the brush holder 14.

The brush retainer 9 is also formed with a hook 28 which is pressed from the sheet metal of the brush retainer 9, during formation of the brush retainer 9, for the optional attachment of electrical components such as a capacitive suppressor (not shown). As shown in FIGS. 5 and 6, the hook 28 is pressed from the grip 21 on the opposite side of the retaining portion 18 to the connecting portion 19.

In the electric motor shown in FIGS. 1 to 3, the two field coils 1 are respectively connected in series with the two brushes 8 by means of two brush retainers 9. However, in motors of different electrical configuration, in which both field coils 1 are connected in parallel to one of the brushes 8 (and neither is directly connected to the other brush 8), a different form of brush retainer is required. A modified brush retainer 29, such as this, is shown in FIGS. 8 and 9.

Figure 8:
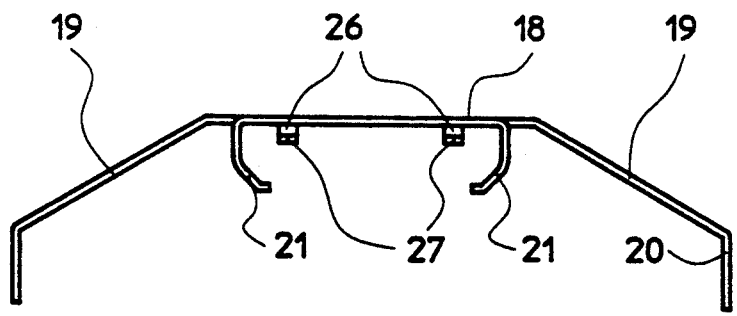
FIGS. 8 and 9 are plan and side views of a modified form of the brush retainer shown in FIGS. 5 to 7.
Figure 9:
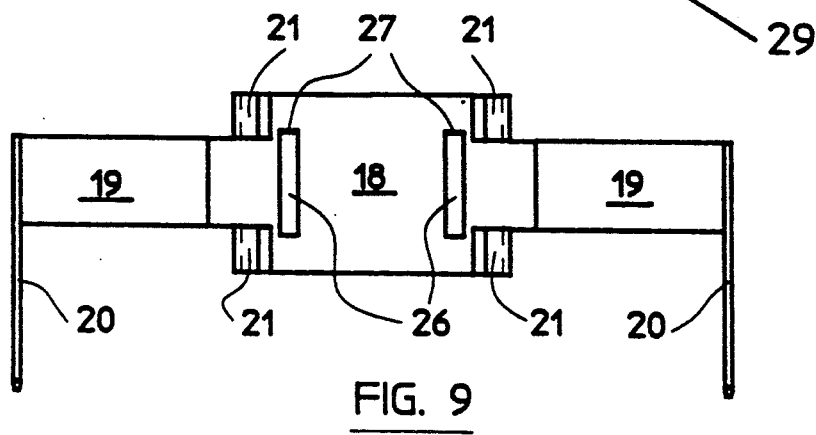

As shown in FIGS. 8 and 9, the modified brush retainer 29 has a retaining portion 18 provided with grips 21 and, on one side, a connecting portion 19 and a second terminal member 20 which are similar in all respects to the retaining portion 18, the connecting portion 19 and the second terminal member 20 of the brush retainer 9 shown in FIGS. 5 to 7. However, the modified brush retainer 29 differs from the brush retainer 9 in that, instead of being provided with a hook 28 on the side of the retaining portion 18 opposite to that of the connecting portion 19 and second terminal member 20, it is provided with a further connecting portion 19 and second terminal member 20.

Thus, as the modified brush retainer 29 is mounted on a brush holder 14, by sliding the retaining portion 18 over the radially outer ends of the brush holder 14 so that the grips 21 ride over the guide means provided by the side extensions 15, the two second terminal members 20, on opposite sides of retaining portion 18, penetrate and engage with respective first terminal members 3 to thereby connect the two field coils 1 directly to the brush 8 retained by the modified brush retainer 29.

What is claimed is:

1. An electric motor, comprising:
   a first terminal member;
   a field coil connected to said first terminal member;
   a brush holder;
   a brush located in said brush holder;
   guide means formed on said brush holder; and
   a brush retainer having means which cooperates with said guide means to guide said brush retainer into and out of a retaining position in which said brush retainer is electrically connected to and retains said brush in said brush holder; said brush retainer being provided with a second terminal member which automatically moves into and out of engagement with said first terminal member in response to movement of said brush retainer into and out of said retaining position.

2. A motor according to claim 1, in which:
   said motor includes a rotor which revolves around a rotary axis;
   said brush holder supports said brush for movement along a radius of said rotary axis, said brush holder having a radially outer surface; and
   said guide means comprises first and second abutment surfaces respectively formed on first and second side extensions of said radially outer surface, said first and second side extensions extending on opposite respective sides of said radius.

3. A motor according to claim 2, in which said brush retainer comprises:
   a retaining portion engaging said radially outer surface of said brush holder;
   first and second grips located on respective opposite sides of said retaining portion, said first and second grips engaging said first and second abutment surfaces, respectively, so as to permit guided movement of the brush retainer along said two side extensions; and
   a connecting portion extending laterally from one side of said retaining portion and carrying, at its free end, said second terminal member.

4. A motor according to claim 3, in which:
   a concavity is formed in said radially outer surface of said brush holder, said concavity including a side wall;
   said retaining portion of said brush retainer is formed of sheet metal and has a retaining strip pressed out of said retaining portion; and
   said retaining strip abutting said side wall when said brush retainer is in said retaining position to prevent withdrawal of said brush retainer from said retaining position.

5. A motor according to claim 4, in which:
   said first terminal member is a metal lined socket having a receiving opening formed therein, said receiving opening having an axis extending parallel to said rotary axis; and
   said second terminal member comprises a plug engageable in said socket.

6. A motor according to claim 1, in which said guide means comprises a plurality of surfaces formed on said brush holder and said brush retainer includes a retaining portion and a plurality of grips, said retaining portion being slidable over one of said surfaces, said grips being slidable over respective ones of the remaining of said surfaces and serving to hold said retaining portion in contact with said one of said surfaces.

7. A motor according to claim 6, further including means for locking said brush retainer in said retaining position.

8. A motor according to claim 7, wherein said locking means comprise a retaining strip extending from said brush retainer and an abutment surface formed in said brush holder, said retaining strip abutting against said abutment surface when said brush retainer is in said retaining position.

9. An electric motor, comprising:
   first and second terminal members;
   first and second field coils connected to said first and second terminal members, respectively;
   first and second brush holders;
   first and second brushes located in said first and second brush holders, respectively;
   first and second guide means formed on said first and second brush holders, respectively;
   a first brush retainer having means which cooperates with said first guide means to guide said first brush retainer into and out of a retaining position in which said first brush is electrically connected to and retains said brush in said first brush holder, said first brush retainer being provided with a third terminal member which automatically moves into and out of engagement with said first terminal member in response to movement of said first brush retainer into and out of its said retaining position;

a second brush retainer having means which cooperates with said second guide means to guide said second brush retainer into and out of a retaining position in which said second brush is electrically connected to and is retained in said second brush holder; said second brush retainer being provided with a fourth terminal member which automatically moves into and out of engagement with said second terminal member in response to movement of said second brush retainer into and out of its said retaining position.

10. A motor according to claim 9, in which:
said motor includes a rotor which revolves around a rotary axis;
said first and second brush holders support said first and second brushes for movement along a first and second radius of said rotary axis, respectively, each of said brush holders having a respective radial outer surface;
said first guide means comprises first and second abutment surfaces respectively formed on first and second side extensions of said radially outer surface of said first brush holder, said first and second side extensions extending on opposite respective sides of said first radius; and
said second guide means comprises first and second abutment surfaces respectively formed on first and second side extensions of said radially outer surface of said second brush holder, said first and second side extensions extending on opposite respective sides of said second radius.

11. A motor according to claim 10, in which:
(A) said first brush retainer comprises:
 (1) a retaining portion engaging said radially outer surface of said first brush holder;
 (2) first and second grips located on respective opposite sides of said retaining portion, said first and second grips engaging said first and second abutment surfaces of said first guide means, respectively, so as to permit guided movement of said first brush retainer along said two side extensions of said first guide means; and
 (3) a connecting portion extending laterally from one side of said retaining portion and carrying, at its free end, said third terminal member; and
(B) said second brush retainer comprises:
 (1) a retaining portion engaging said radially outer surface of said second brush holder;
 (2) first and second grips located on respective opposite sides of said retaining portion, said first and second grips engaging said first and second abutment surfaces of said second guide means, respectively, so as to permit guided movement of said second brush retainer along said two side extensions; and
 (3) a connection portion extending laterally from one side of said retaining portion and carrying, at its free end, said fourth terminal member.

12. A motor according to claim 11, in which:
a respective concavity is formed in said radially outer surfaces of said first and second brush holders, respectively, each of said concavities including a respective side wall;
said retaining portion of said first and second brush retainers are each formed of sheet metal and each have a respective retaining strip pressed out of said retaining portion; and each said retaining strip abuts said side wall of said brush holder with which it is associated when said brush retainer is in its said retaining position to prevent withdrawal of said brush retainers from their respective said retaining positions.

13. A motor according to claim 9, in which:
(A) said first guide means comprises a plurality of surfaces formed on said first brush holder and said first brush retainer includes a retaining portion and a plurality of grips, said retaining portion of said first brush holder being slidable over one of said surfaces of said first guide means, said grips being slidable over respective ones of the remaining of said surfaces of said first guide means and serving to hold said retaining portion of said first brush retainer in contact with said one of said surfaces of said first guide means; and
(B) said second guide means comprises a plurality of surfaces formed on said second brush holder and said second brush retainer includes a retaining portion and a plurality of grips, said retaining portion of said second brush retainer being slidable over one of said surfaces of said second guide means, said grips of said second brush retainer being slidable over respective ones of the remaining of said surfaces of said second guide means and serving to hold said retaining portion of said second brush retainer in contact with said one of said surfaces of said second guide means.

14. A motor according to claim 13, further including means for locking said first and second brush retainers in their respective brush positions.

15. A motor according to claim 14, wherein said locking means comprises retaining strips extending from said brush retainers and abutment surfaces formed in said brush holders, each said retaining strip abutting against a respective abutment surface when said first and second brush retainers are in their respective retaining positions.

16. An electric motor, comprising:
first and second terminal members;
first and second field coils connected to said first and second terminal members, respectively;
a brush holder;
a brush located in said brush holder;
guide means formed on said brush holder; and
a brush retainer having means which cooperates with said guide means to guide said brush retainer into and out of a retaining position in which said brush retainer is electrically connected to and retains said brush in said brush holder;
said brush retainer being provided with third and fourth terminal members which automatically move into and out of engagement with said first and second terminal members, respectively, in response to movement of said brush retainer into and out of said retaining position.

17. A motor according to claim 16, in which:
said motor includes a rotor which revolves around a rotary axis;
said brush holder supports said brush for movement along a radius of said rotary axis, said brush holder having a radially outer surface; and
said guide means comprises first and second abutment surfaces respectively formed on first and second side extensions of said radially outer surface, said first and second side extension means extending in opposite respective sides of said radius.

18. A motor according to claim 17, in which said brush retainer comprises:

a retaining portion engaging said radially outer surface of said brush holders;

first and second grips located on respective opposite sides of said retaining portion, said first and second grips engaging said first and second abutment surfaces, respectively, so as to permit guided movement of said brush retainer along said two side extensions; and first and second connecting portions extending laterally from opposite respective sides of said retaining portion and carrying, at their respective free ends, said third and forth terminal members, respectively.

19. A motor according to claim 18, in which:

a concavity is formed in said radially outer surface of said brush holder, said concavity including a side wall;

said retaining portion of said brush retainer is formed of sheet metal and has a retaining strip pressed out of said retaining portion; and said retaining strip abuts said side wall when said brush retainer is in said retaining position to prevent withdrawal of said brush retainer from its said retaining position.

20. A motor according to claim 19, in which:

said first and second terminal members are each metal lined sockets having respective receiving openings formed therein, said receiving openings having respective axes extending parallel to said rotary axis; and said third and fourth terminal members comprise respective plugs engageable with said first and second sockets, respectively.

21. A motor according to claim 16, in which said guide means comprises a plurality of surfaces formed on said brush holder and said brush retainer includes a retaining portion and a plurality of grips, said retaining portion being slidable over one of said surfaces, said grips being slidable over respective ones of the remaining of said surfaces and serving to hold said retaining portion in contact with said one of said surfaces.

22. A motor according to claim 21, further including means for locking said brush retainer in said retaining position.

23. A motor according to claim 22, wherein said locking means comprise a retaining strip extending from said brush retainer and an abutment surface formed in said brush holder, said retaining strip abutting against said abutment surface when said brush retainer is in said retaining position.

24. A fractional-horsepower electric motor, comprising:

(a) a stator comprising:
  (1) a stack of field laminations;
  (2) end rings located at opposite respective ends of said stack;
  (3) fist and second field coils wound around said stack; and
  (4) brush gear located at adjacent one of said end rings;

(b) a rotor incorporating a commutator mounted in said stator for rotation about an axis of said motor;

(c) said end ring located adjacent said brush gear being formed with first and second metal lined sockets having respective axes extending parallel to said axis of the motor;

(d) third and fourth metal lined sockets being formed in at least one of said end rings;

(e) one end of each of said field coils being connected to a metal lining of said first and second sockets, respectively, a remaining end of each of said field coils being connected to a metal lining of said third and fourth sockets, respectively;

(f) said brush gear comprising first and second brush holders having respective brush passages formed therein, first and second brushes respectively mounted on said first and second brush holders and first and second brush springs respectively mounted in said first and second brush passages for engagement with said commutator, first and second brush retainers respectively mounted in said first and second brush passages and each disposed between one of said brushes and one of said brush retainers;

(g) each brush holder having a radially outer surface, a concavity formed in said outer surface and having a radially inward facing, traversely extending end wall, guide means in the form of side extensions projecting transversely on opposite sides of an axial plane through said brush holder and two abutment surfaces respectively formed in said side extensions and facing inwardly and away from said radially outer surface;

(h) said first brush retainer comprising a sheet metal retaining portion engaging said radially outer surface of said first brush holder, a retaining strip pressed out of said retaining portion and disposed within said concavity formed in said radially outer surface of said first brush holder, grips located on opposite sides of said retaining portion and engaging said two abutment surfaces of said first brush holder so as to permit guided movement of said first brush retainer along said two side extensions of said first brush holder, a connecting portion extending laterally from one side of said retaining portion, and a plug extending from said connecting portion, parallel to said axis of the motor, said plug being movable into and out of engagement with said first socket in response to movement of said brush retainer into and out of said retaining position, said retaining strip abutting a wall of said concavity in said first brush holder when said first brush retainer is in its said brush retaining position; and (i) said second brush retainer comprising a sheet metal retaining portion engaging said radially outer surface of said second brush holder, a retaining strip pressed out of said retaining portion and disposed within said concavity formed in said radially outer surface of said second brush holder for engagement with said end wall of said concavity, grips located on opposing sides of said retaining portion and engaging said two abutment surfaces of said second brush holder so as to permit guided movement of said second brush retainer along said two side extensions of said second brush holder, a connecting portion extending laterally from one side of said retaining portion, and a plug extending from said connecting portion, parallel to said axis of said motor, said plug moving into and out of engagement with said second socket in response to movement of said second brush retainer into and out of its said retaining position, said retaining strip abutting a wall of said concavity in said second brush holder when said second brush retainer is in its said retaining position.

25. A motor according to claim 2, wherein said first and second side extensions face away from said radially outer surface.

* * * * *